United States Patent
Kanai

Patent Number: 5,898,682
Date of Patent: Apr. 27, 1999

[54] RADIO CHANNEL CONTROL APPARATUS USED IN A CDMA CELLULAR SYSTEM AND CAPABLE OF CHANGING CELL SIZE

[75] Inventor: Toshihito Kanai, Tokyo, Japan

[73] Assignee: NEC Corporation, Tokyo, Japan

[21] Appl. No.: 08/814,341

[22] Filed: Mar. 11, 1997

[30] Foreign Application Priority Data

Mar. 11, 1996 [JP] Japan .................... 8-053095

[51] Int. Cl.⁶ .................................... H04Q 7/00
[52] U.S. Cl. .................... 370/331; 370/342; 455/522
[58] Field of Search .................. 370/252, 320, 370/342, 332; 455/436, 442, 439, 522; 375/200, 206

[56] References Cited

U.S. PATENT DOCUMENTS

| 5,455,967 | 10/1995 | Amezawa et al. |
| 5,499,395 | 3/1996 | Doi ........................ 455/33.1 |
| 5,771,461 | 6/1998 | Love ...................... 455/522 |

FOREIGN PATENT DOCUMENTS

| 0505341 | 9/1992 | European Pat. Off. |
| 0615395 | 9/1994 | European Pat. Off. |
| 0682417 | 11/1995 | European Pat. Off. |
| 2-220526 | 9/1990 | Japan |
| 5-145516 | 6/1993 | Japan |
| 2280570 | 7/1993 | United Kingdom |
| WO 97 08909 | 3/1997 | WIPO |

*Primary Examiner*—Jeffery A. Hofsass
*Assistant Examiner*—Clement Townsend
*Attorney, Agent, or Firm*—Sughrue, Mion, Zinn, Macpeak & Seas, PLLC

[57] ABSTRACT

A radio channel control section 370 transmits and receives to and from an adjacent base station uplink/downlink channel communication qualities measured by a communication channel transmit/receive section 330 and a mobile station 410, respectively, compares them with predetermined lower and upper threshold values Tl/Th, requests a pilot channel transmit section 350 to decrease and increase the transmission power level of a pilot signal if the threshold value Tl is not reached and the threshold value Th is exceeded, respectively. For a downlink channel, a hand-off parameter is increased and decreased if the threshold value Tl is not reached and the threshold value Th is exceeded, respectively. For an uplink channel, the hand-off parameter is decreased and increased if the threshold value Tl is not reached and the threshold value Th is exceeded, respectively.

14 Claims, 12 Drawing Sheets

RADIO CHANNEL CONTROL APPARATUS USED IN A CDMA CELLULAR SYSTEM AND CAPABLE OF CHANGING CELL SIZE

BACKGROUND OF THE INVENTION

This invention relates to a CDMA (Code Division Multiple Access) cellular system, and in particular, to a radio channel control apparatus which is used in a base station of the CDMA (Code Division Multiple Access) cellular system.

Generally, a mobile communication system such as mobile telephone system employs a cellular system. The cellular system has a service area which is divided into a plurality of cells. A plurality of base stations are respectively arranged in the cells. Each of the base stations can communicate with mobile stations which are located in each of the cells at the same time in a multiple access fashion.

A frequency division multiple access (FDMA) system and a time division multiple access (TDMA) system are often used in the mobile communication system so that the mobile communication system attain the multiple access fashion.

Recently, attention is focused upon a code division multiple access (CDMA) system. This is because the code division multiple access (CDMA) system is achieved by spectrum spreading using a spread code which is different for each channel, and thereby has high efficiency in frequency utilization.

In a CDMA cellular system, a quality of communications between the base station and the mobile stations is gradually deteriorated with an increase of a traffic. Accordingly, the traffic is restricted by the base station so that a required quality level is maintained in the cell.

A conventional radio channel control apparatus is equipped in each of the base stations. The conventional radio channel apparatus detects the traffic in the cell and compares the traffic with a predetermined value. When the traffic is larger than a predetermined value, the conventional radio channel apparatus inhibits a new call origination.

In the CDMA cellular system using conventional radio channel control apparatuses, there is a case that the call origination is inhibited under restriction of the traffic by one of the base stations in the cell while an adjacent radio station have a sufficient traffic handling capacity. Thus, although the overall CDMA cellular system has a spare capacity for the traffic, communication is limited.

SUMMARY OF THE INVENTION

It is therefore an object of this invention to provide a radio channel control apparatus capable of changing a size of a cell.

It is another object of this invention to provide a radio channel control apparatus capable of controlling a power of a pilot signal.

It is still another object of this invention to provide a radio channel control apparatus capable of controlling a hand-off parameter of a mobile station.

It is still another object of this invention to provide a radio channel control apparatus in a CDMA cellular system which is capable of expanding, in occurrence of concentration of the traffic in a particular cell, a traffic handling capacity of the overall system by handling a part of the traffic by an adjacent cell.

Other objects of this invention will become clear as the description proceeds.

On describing the gist of this invention, it is possible to understand that a radio channel control apparatus is used in a base station of a CDMA cellular system to control communication which is carried out between the base station and mobile stations in a cell by the use of code-division multiplexed radio channels and a pilot signal sent from the base station, with a communication quality is monitored by the base station.

According to an aspect of this invention, the radio channel control apparatus comprising a quality monitoring means for monitoring the communication quality of at least one of the code-division multiplexed radio channels to produce a quality monitoring signal representative of the communication quality, and power level control means for controlling a power level of the pilot signal in response to the quality monitoring signal to change the cell in size from one to another in dependency upon the power level of the pilot signal.

According to another aspect of this invention, a radio channel control apparatus is used in a base station of a CDMA cellular system to control communication which is carried out between the base station and mobile stations in a radio zone by the use of code-division multiplexed radio channels and a control channel, with a communication quality monitored by the base station. The radio channel control apparatus comprises quality monitoring means for monitoring the communication quality of at least one of the code-division multiplexed radio channels to produce a quality monitoring signal representative of the communication quality, and parameter delivery means for delivering a hand-off parameter to the mobile stations through the control channel in response to the quality monitoring signal to practically change the cell in size from one to another in dependency upon the hand-off parameter.

According to still another aspect of this invention, a CDMA cellular system has base stations each of which has a radio channel control apparatus to control communication carried out between the base station and mobile stations in a cell by the use of code-division multiplexed radio channels with a communication quality monitored by the base station. The radio channel control apparatus of each of the base stations comprises cell size control signal producing means for producing a cell size control signal for changing the cell in size from one to another, quality monitoring means for monitoring the communication quality of at least one of the code-division multiplexed radio channels to produce a quality monitoring signal representative of the communication quality, and level control means for controlling the cell size control signal in response to the quality monitoring signal to change the cell in size from one to another in dependency upon cell size control signal.

DESCRIPTION OF THE PREFERRED EMBODIMENTS

Figure 1:
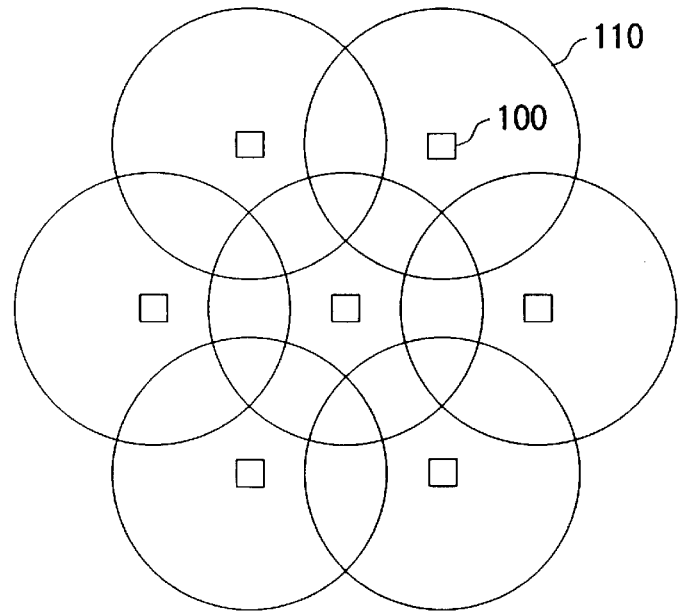
FIG. 1 shows a view for use in describing cells of a general cellular system.
Figure 2:
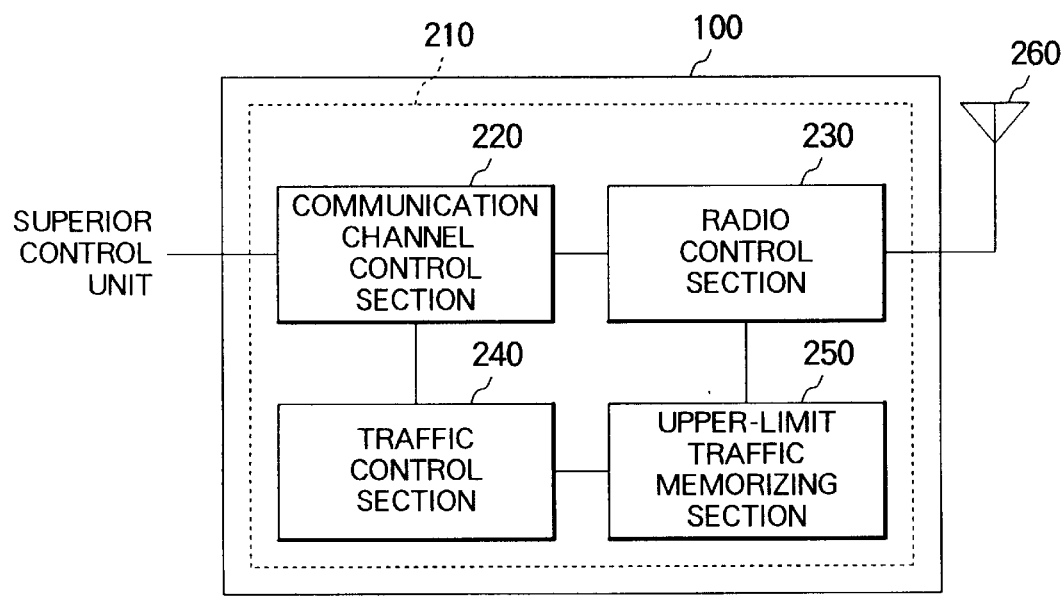
FIG. 2 is a block diagram of a conventional radio channel control apparatus.

Referring to FIGS. 1 and 2, description will be at first directed to a conventional CDMA cellular system and a conventional radio channel control apparatus for a better understanding of this invention.

In FIG. 1, the conventional CDMA cellular system has a plurality of base stations (shown by small square) 100 which are arranged in a service area to divided the service area into a plurality of cells (shown by circle) 110. Each of the base stations 100 transmits a pilot signal through a pilot channel. The pilot signal specifies a size of the cell 110. The pilot signal is transmitted at a predetermined power level so that the cell 110 keeps a preselected size to avoid presence of a gap between adjacent cells 110. For example, it is assumed that the base stations 100 are arranged at an equal interval as illustrated in FIG. 1. In this event, the base stations 100 transmit their pilot signals at the same power level so that the sizes of the cells 110 become equal to each other.

With reference to the reception levels of the pilot signals a mobile station (not shown) located in the service area selects one of the base stations 100 to communicate with the base station. Namely, the mobile station selects one of the base stations 100 which is in a particular cell corresponding to a higher level, typically, a nearer base station 100. In an overlap area where the cells 110 overlap each other or in a boundary region between the cells 110, the base station selected for communication is changed to another if appropriate.

The CDMA cellular system has a characteristic that the quality of a communication channel is gradually deteriorated with an increase of the traffic. In case of occurrence of an excessive traffic, the quality of communication is degraded to a level below a required level. This results in various troubles during communication, such as difficulty in catching a speech sound and decrease in throughput of data communication.

In order to solve the above-mentioned problem, the conventional radio channel control apparatus is equipped in each base station 100 in the conventional CDMA cellular system of the above-mentioned type.

In FIG. 2, the base station 100 has the radio channel control apparatus 210 which comprises a communication channel control section 220, a radio control section 230, a traffic control section 240, and an upper-limit traffic memorizing section 250. The base station 100 restricts the traffic to be handled in each base station to a predetermined amount or less so that the communication quality is not degraded below the required level.

The communication channel control section 220 is connected to the radio control section 230, a superior control unit (not shown), and the traffic control section 240. The communication channel control section 220 is controlled by the traffic control section 240 to control a communication channel. For example, the communication channel control section 220 assigns a radio channel for communication with a mobile station within the cell of the base station 100.

The radio control section 230 establishes the communication channel for connection with the mobile station through an antenna 260.

The traffic control section 240 receives an allowable traffic amount from the upper-limit traffic memorizing section 250. The allowable traffic amount secures an excellent communication quality in this base station 100. The traffic control section 240 controls the communication channel control section 220 in response to the allowable traffic amount so that the traffic to be handled in the communication channel control section 220 is suppressed to the allowable traffic amount or less.

For example, a technique relating to the above-mentioned control by the traffic amount is described in Japanese Unexamined Patent Publication No. 220526/1990.

The technique utilizes the fact that reception power of a base station is varied in dependence upon the traffic amount. Specifically, the traffic amount being handled in the base station is estimated by detecting electric power of a radio signal received by the base station. In dependence upon the result of estimation, control means, such as the traffic control section 240 and communication channel control section 220, controls permission and inhibition of communication. Thus, it is possible to achieve the above-mentioned object of maintaining the communication quality at the required level or more by suppressing the traffic amount to be handled to the predetermined amount or less.

Another technique is disclosed, for example, in Japanese Unexamined Patent Publication No. 145516/1993.

In this technique, a base station distinguishes communication attributes (speech communication, facsimile communication, data communication, and so on) of a plurality of radio terminals (or mobile stations). A memory, such as the upper limit traffic memorizing section 250, memorizes allowable traffic amounts for the respective communication attributes. With reference to the contents memorized in the memory, the traffic at each radio terminal accommodated is controlled so as to maintain the traffic amount not greater than the allowable traffic amount. Therefore, undesirable interruption of communication due to occurrence of excessive traffic is not caused to occur. As a result, it is possible to achieve an object of assuring higher reliability and enabling effective utilization of radio waves.

In the conventional radio channel control apparatus in the CDMA cellular system described above, each base station can not handle the traffic exceeding the allowable amount determined in each base station. On the other hand, for each mobile station, the transmission power level of the pilot signal defining a communicable area as the cell of each base station is fixed so that the size of the cell of each base station is unchanged. As a result, a number of the mobile stations may concentrate in a single cell to produce a large number of calls. In this event, call origination is inhibited under restriction of the traffic by the base station in that cell. Despite the fact that the adjacent cell includes only a small number of mobile stations and the base station in the adjacent cell has a sufficient traffic handling capacity, the mobile stations inhibited from call origination as described above can not carry out communication. Thus, although the overall system has a spare capacity for the traffic, communication can not be carried out. In other words, the traffic handling capacity can not be effectively utilized.

Figure 3:
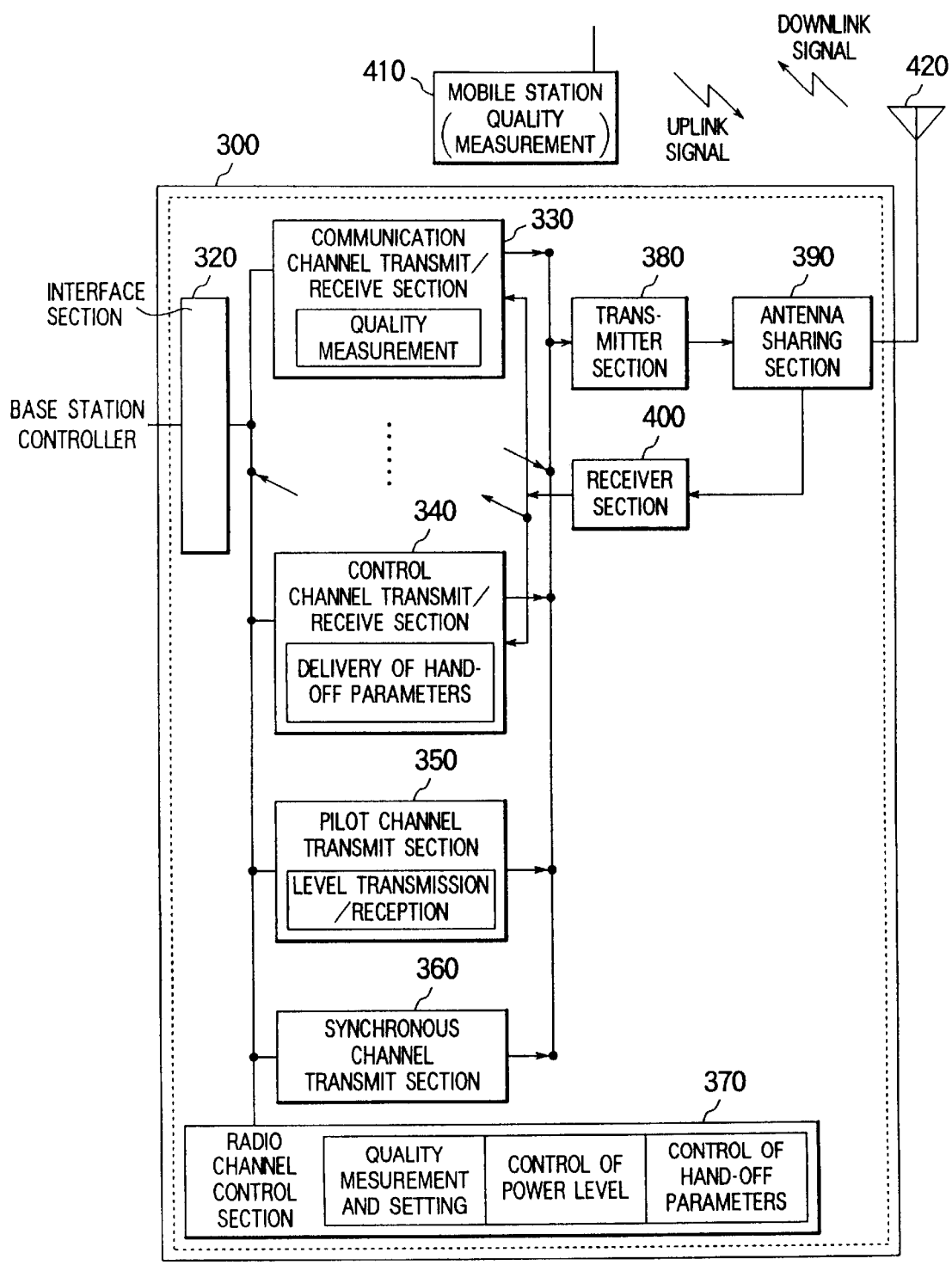
FIG. 3 is a block diagram of a radio channel control apparatus according to a preferred embodiment of this invention.
Figure 16:
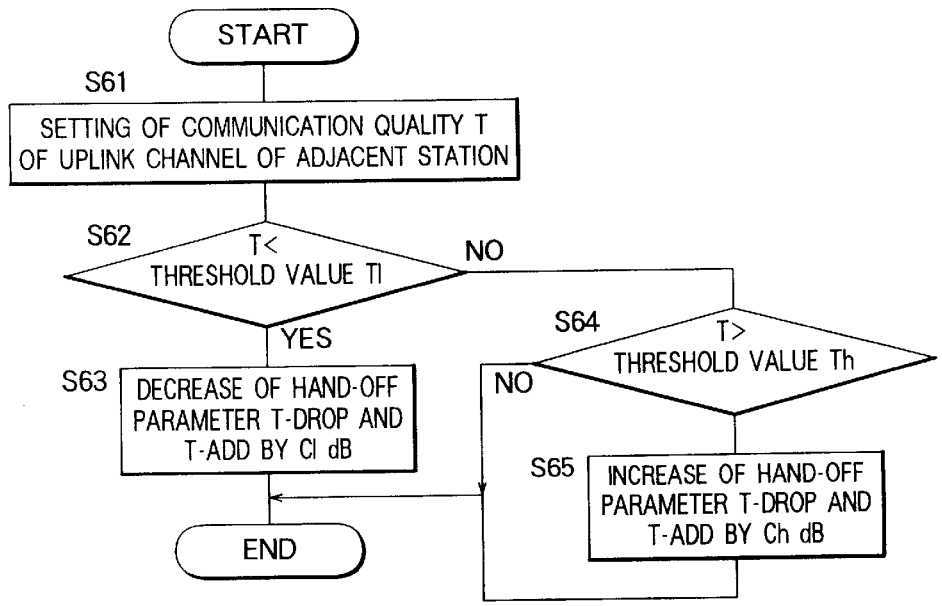
FIG. 16 is a flow chart for use in describing a sixth operation of the radio channel control apparatus illustrated in FIG. 3.

Referring to FIGS. 3 and 16, description will be made about a radio channel control apparatus according to a preferred embodiment of this invention.

A CDMA cellular system to which this invention is applied is a system adapted to the United States Cellular System Standard IS-95-A (Telecommunication Industry Association, TIA/EAI/IS-95-A, "Mobile Station—Base Station Compatibility Standard for Dual-Mode Wideband Spread Spectrum Cellular System").

In FIG. 3, the CDMA cellular system has a plurality of base stations 300 (only one shown) which are connected to a base station controller (not shown). Each of the base stations 300 has the radio channel control apparatus 310.

The radio channel control apparatus 310 comprises an interface section 320, a plurality of communication channel transmit/receive sections 330, a control channel transmit/receive section 340, a pilot channel transmit section 350, a synchronous channel transmit section 360, a radio channel control section 370, a transmitter section 380, an antenna sharing section 390, and a receiver section 400. Each of the base stations 300 is communicable with a plurality of mobile stations (only one shown) 410 through an antenna 420.

The interface section 320 translates a communication signal which includes a downlink and a uplink signals between the communication channel transmit/receive section 330 and the base station controller and translates a control signal which includes a downlink and a uplink control signals between the control channel transmit/receive section 340 and the base station controller.

The communication channel transmit/receive section 330 receives the downlink communication signal from the interface section 320. The downlink communication signal is spread by the use of a spread code which is specific to each channel to produce a spread downlink communication signal in the communication channel transmit/receive section 330. The spread downlink communication signal is supplied to the transmitter section 380 from the communication channel transmit/receive section 330.

On the other hand, the communication channel transmit/receive section 330 receives a spread uplink communication signal from the receiver section 400. The spread uplink communication signal is subjected to despreading by the use of the spread code which is specific to each channel to retrieve an unspread uplink communication signal in the communication channel transmit/receive section 330. The unspread uplink communication channel signal is supplied to the interface section 320 as the uplink communication signal from the communication channel transmit/receive section 330.

In addition, the communication channel transmit/receive section 330 periodically measures or monitors an uplink signal quality (the bit error rate and the frame error rate) which is informed to the radio channel control section 370 by an uplink quality signal. Moreover, the communication channel transmit/receive section 330 receives a downlink quality signal which is representative of a downlink signal quality and is periodically supplied from the mobile station 410. The downlink quality signal is supplied to the radio channel control section 370 together with the uplink quality signal.

The control channel transmit/receive section 340 receives the downlink control signal from the interface section 320. The downlink control signal is spread by the use of a spread code which is specific to each channel to produce a spread downlink control signal in the control channel transmit/receive section 340. The spread downlink control channel signal is supplied to the transmitter section 380 from the control channel transmit/receive section 340.

On the other hand, the control channel transmit/receive section 340 receives a spread uplink control signal from the receiver section 400. The spread downlink control signal is subjected to inverse spreading by the use of a spread code which is specific to each channel to retrieve an unspread uplink control signal in the control channel transmit/receive section 340. The unspread uplink control signal is supplied to the interface section 320 from the the control channel transmit/receive section 340 as the uplink control signal.

In addition, the control channel transmit/receive section 340 memorizes and delivers a hand-off parameters T-DROP and T-ADD on a downlink control channel towards the mobile station 410. It is noted here that the hand-off parameters T-DROP and T-ADD are rewritten in response to the request from the radio channel control section 370.

The pilot channel transmit section 350 produces a spread pilot signal which is spread by the use of a specific spread code and supplies the spread pilot signal to the transmitter section 380 like the spread downlink communication signal or the spread downlink control signal.

On the other hand, the pilot channel transmit section 350 informs the transmission power level of the spread pilot signal to the radio channel control section 370. The transmission power level of the spread pilot signal can be modified into higher and lower levels in response to a level control signal supplied from the radio channel control section 370. The spread pilot signal transmitted from the pilot channel transmit section 350 is continuously supplied to a pilot signal receiver of the mobile station 410.

The mobile station 410 compares reception levels of a plurality of received pilot signals from a plurality of base stations to select one of the base stations to communicate with.

The synchronous channel transmit section 360 produces a spread synchronous signal spread by the use of a specific spread code and delivers the spread synchronous signal to the transmitter section 380 like the spread downlink communication signal or the spread downlink control signal.

The radio channel control section 370 receives the uplink quality signal and the downlink quality signal from the communication channel transmit/receive section 330 and calculates, for each of the uplink and the downlink signals, the ratio of the measured values exceeding an average communication quality, a median, or a required quality to decide or set the ratio as each of the uplink communication quality and the downlink communication quality of this base station. These communication quality is called a specified communication quality.

Furthermore, the radio channel control section 370 informs the communication quality of this base station through the interface section 320 and the base station controller to radio channel control sections 370 of a plurality of adjacent base stations. Similarly, the radio channel control section 370 is informed of the communication quality of each adjacent base station from the radio channel control section 370 of each adjacent base station 300 through the base station controller and the interface section 320.

With reference to the specified communication quality, the radio channel control section 370 may request the control channel transmit/receive section 340 to rewrite the hand-off parameters.

Furthermore, with reference to the specified communication quality, the radio channel control section 370 requests the pilot channel transmit section 350 to modify the transmission power level of the pilot signal to a higher or a lower level.

The radio channel control section 370 informs the specified transmission power level of the pilot signal to the radio channel control section 370 of each adjacent base station 300 through the interface section 320 and the base station controller. In addition, the radio channel control section 370 is informed of the transmission power level of the pilot channel signal specified in each adjacent base station from the radio channel control section 370 of each adjacent base station through the base station controller and the interface section 320. Namely, the base station translates a level information signal which is representative of the transmission power level at each base station to adjacent base stations which are adjacent to each base station. The level information signal may be called an arbitration signal.

Supplied with the transmission power level of the pilot signal of the adjacent base station and with reference to a propagation loss model of the radio signal and the topography information, the radio channel control section 370 estimates the profile of the cell of the adjacent base station and determines the transmission power level of the pilot signal of this base station so that no gap (signal-insensitive zone) is produced between the cells of the both stations. In order to facilitate the control, estimation of the profile of the cell may be carried out by calculating an approximate cell radius alone in accordance with a propagation loss formula to determine the transmission power level of the pilot signal.

The transmitter section 380 receives as a digital signal the spread downlink communication signal and the spread downlink control signal produced from each of the communication channel transmit/receive section 330 and the control channel transmit/receive section 340 together with the spread synchronous signal and the pilot signal. The transmitter section 380 converts the digital signal into an analog signal. The analog signal is subjected to modulation, frequency conversion into a radio frequency band, filtering, and amplification to be delivered through the antenna sharing section 390 and the antenna 420 to the mobile station 410.

On the other hand, the receiver section 400 is supplied with the uplink signal through the antenna 420 and the antenna sharing section 390 from the mobile station 410. The uplink signal received as an analog signal is subjected to filtering, amplification, frequency conversion, and demodulation, and then converted into a digital signal. Thereafter, the digital signal is delivered to the communication channel transmit/receive section 330 and the control channel transmit/receive section 340.

Next, description will be made about the CDMA cellular system of the United States Standard IS-95-A used in this invention. In this system, it is presumed that each base station continuously transmits the pilot signal spread by each specific spread code and that the mobile station carries out communication by selecting one of a plurality of neighborhood base stations with reference to the reception levels of their pilot signals. In this invention, when the reception level of the pilot signal supplied from a communicating base station to the mobile station does not satisfy the hand-off parameter T-DROP, communication with the communicating base station is disconnected. On the other hand, when the reception level of the pilot signal supplied from another base station other than the communicating base station exceeds the hand-off parameter T-ADD, communication with the above-mentioned another base station is started.

Thus, in the above-mentioned CDMA cellular system, either the transmission power level of the pilot signal or each hand-off parameter is modified to an upper or a lower level so as to vary the cell size, thereby controlling the traffic of each base station. Thus, the communication quality is kept excellent.

This invention is different from the prior art in the following respects. Specifically, the control channel transmit/receive section 340 can rewrite the hand-off parameters set in the mobile station. The pilot channel transmit section 350 is operable to increase and decrease a transmission power level of the pilot channel signal. In addition, the radio channel control section 370 specifies the communication quality based on a measured quality and, with reference to the communication quality thus specified, requests modification of at least one of the hand-off parameters to be transmitted to each mobile station 410 and the transmission power level of the pilot channel signal. Thus, as illustrated in FIG. 4, it is possible to change the size of the cell where the mobile station 410 is communicable.

Figure 4:
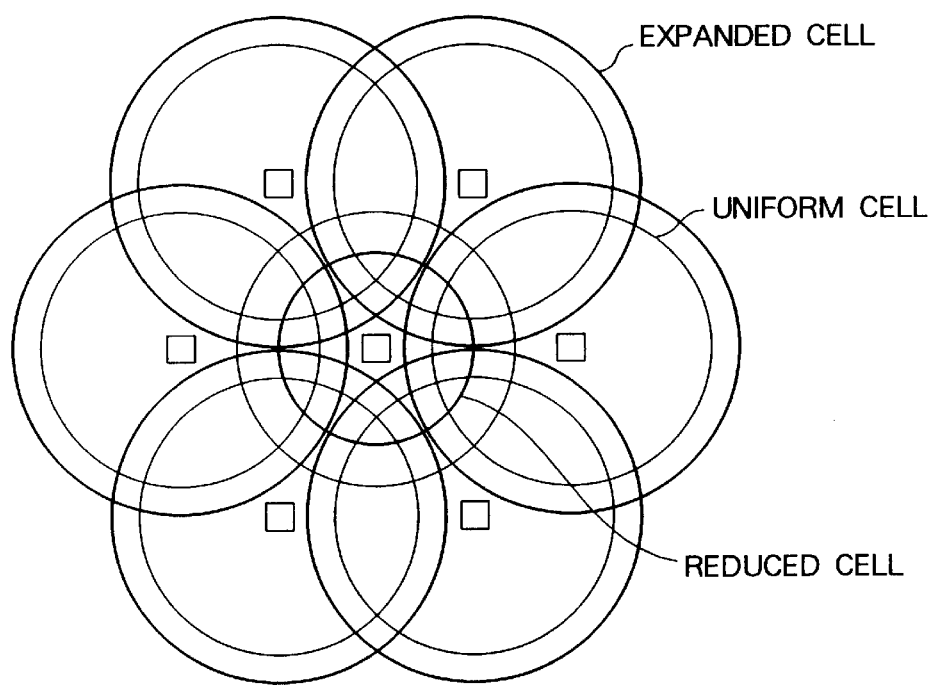
FIG. 4 shows a view for use in describing change in cell sizes.

In FIG. 4, thin circles illustrate cells which have uniform size and thick circles show cells which have expanded or reduced size.

Next referring to FIGS. 5 and 6 in combination, description will be made about the case where the transmission power level of the pilot signal is modified to an upper or a lower level to vary the cell size according to a first invention.

Figure 5:
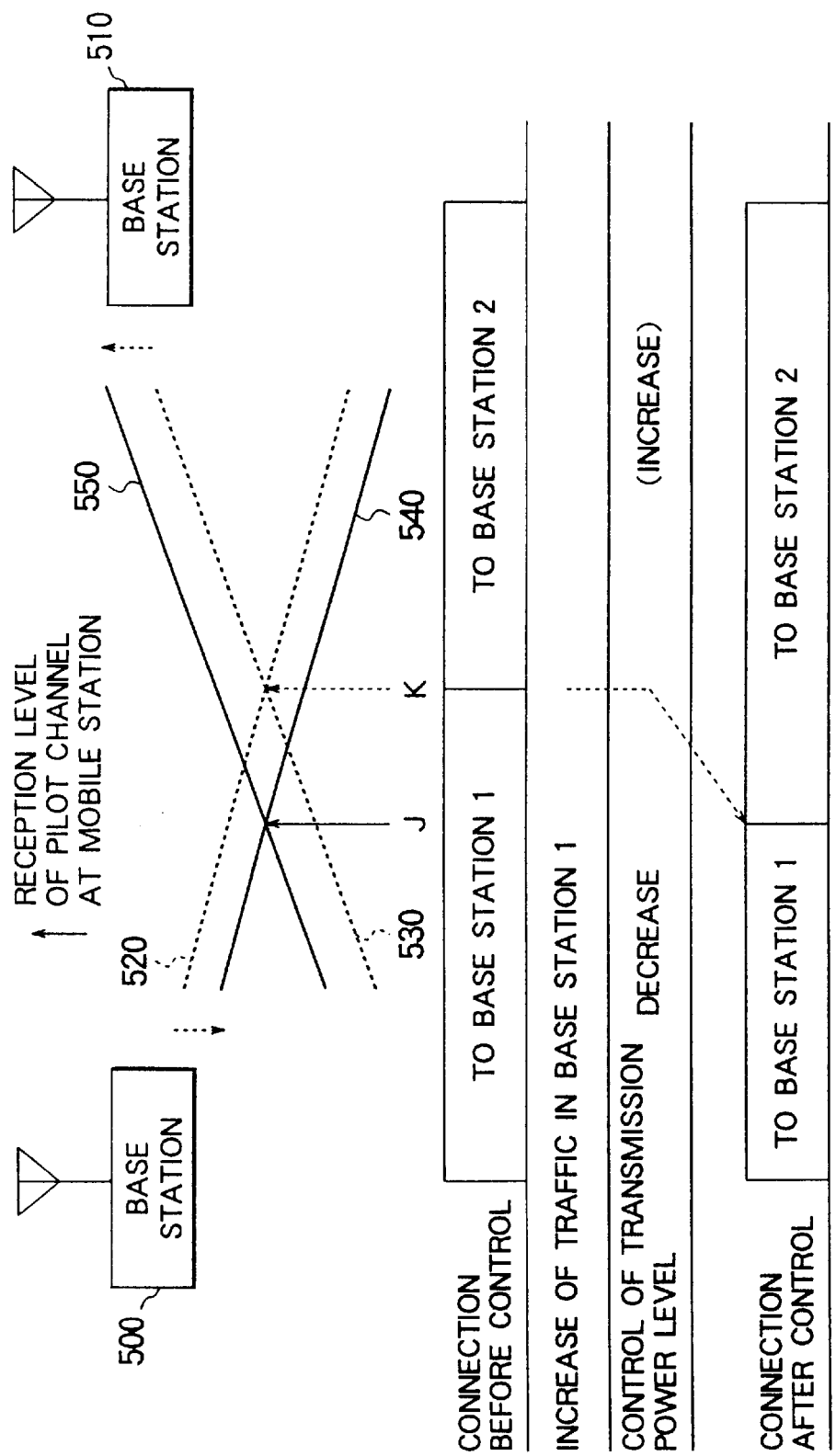
FIG. 5 shows a view for use in describing change of destination of a connection request from a mobile station located between two cells in response to change of transmission power of pilot signals.

In FIG. 5, the mobile station (not shown) is located between the base stations 500 and 510. The mobile station is in a standby state and selects one of the base stations 500 and 510 for connection with.

The mobile station (not shown) in a standby state measures the reception level of the pilot channel signal of each base station and requests connection to one of the base stations which corresponds to a maximum reception level.

At first, it is assumed that, prior to control of modification in cell size, the transmission power levels of the pilot channel signals of the base stations 500 and 510 are equal to each other and the reception levels of the pilot channels of the mobile stations are represented by dotted-line level diagrams 520 and 530. In this event, the boundary line between the base stations 500 and 510 to be selected is located at an intermediate point K between the base stations 500 and 510.

When the traffic handling amount of the base station 500 approaches the allowable limit, the base station 500 detects the deterioration of the communication quality. Then, the base station 500 decreases the transmission power level of the pilot signal so that the reception level of the pilot signal received at the mobile station is decreased as represented by a solid line 540 in FIG. 5.

In this event, the boundary line is shifted towards the base station 500. This will result in occurrence of a gap between the cells as far as no control is carried out. It is assumed here that the adjacent base station 510 has an excellent communication quality exceeding a predetermined value while the base station 500 is in the above-mentioned condition. In this event, the base station 510 can increase the transmission power level of the pilot signal to thereby increase the reception level of the pilot signal received at the mobile station as shown by a solid line 550 in FIG. 5. As a consequence, the boundary line is shifted to a cross point J of the solid lines 540 and 550 so as to obtain an overlapping area.

In other words, for the mobile station in a standby state, the cell size of the base station 500 is reduced while the cell size of the base station 510 is expanded. As a consequence, in the base station 500, the reduction in cell size brings about an increase in margin for thermal noise. Thus, the allowance of the traffic handling amount is increased and the occurrence of a new traffic for the base station 500 is decreased.

Although the cell size is reduced because the base station 500 has a large traffic to be handled and therefore deteriorated in communication quality, any other adjacent base station such as the base station 510 may not have a communication quality exceeding the predetermined level. In this event, in order to avoid the risk of producing the gap between the cells, the adjacent base stations inform the transmission power levels of the pilot channel signals to each other.

Figure 6:
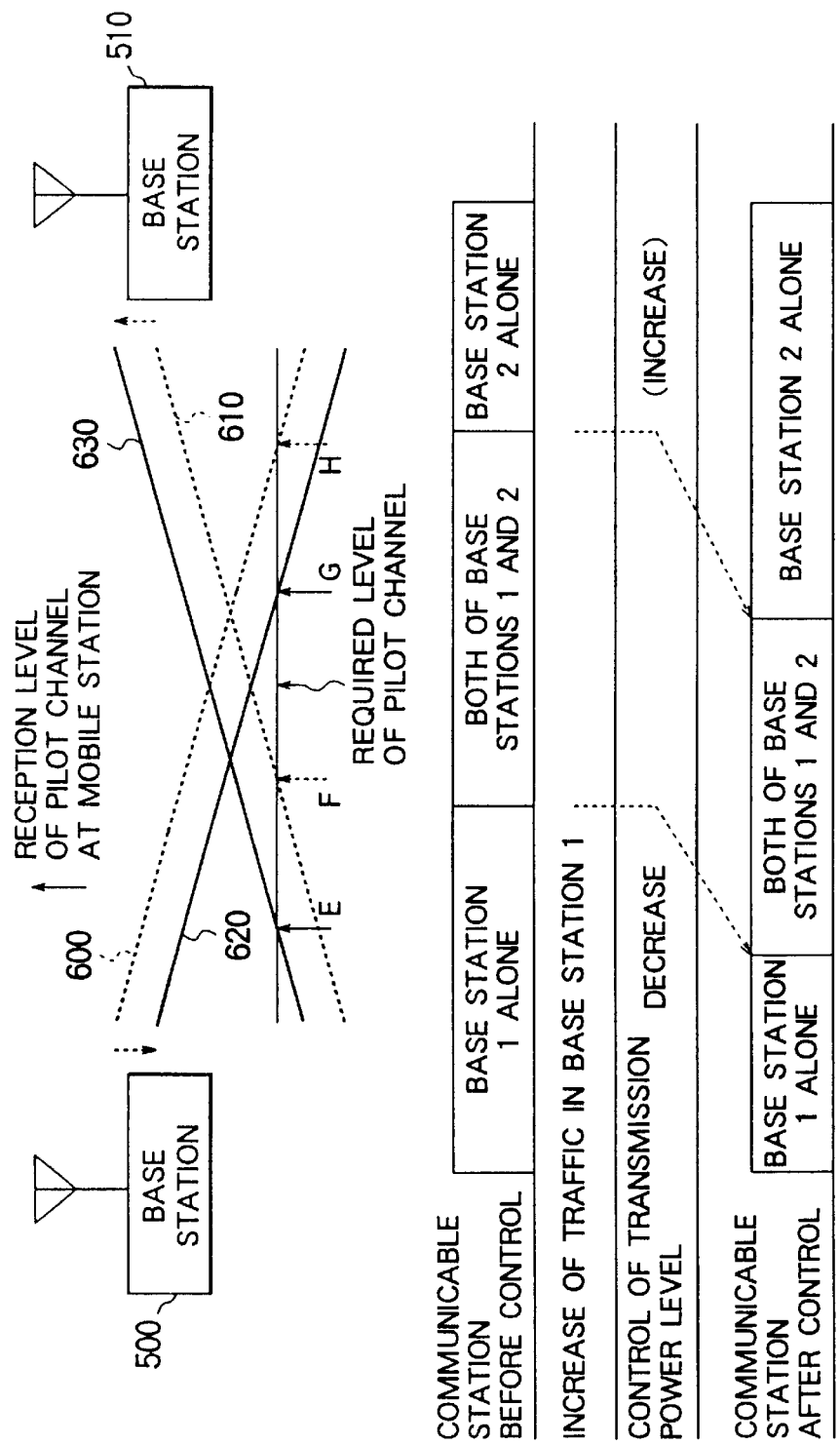
FIG. 6 shows a view for use in describing change of communicable ranges following the variation of transmission power of pilot signals.

Next, FIG. 6 is a view for describing which one of the base stations 500 and 510 is communicable with the communicating mobile station.

The communicating mobile station measures the reception level of the pilot signal of each base station. When the reception levels of the pilot signals of a plurality of base stations exceed the required level, simultaneous communication is possible with the plurality of base stations. The above-mentioned situation is called soft hand-off. The communication quality can be improved by a site diversity effect.

It is assumed here that the transmission power levels the pilot signals of the two base stations 500 and 510 are substantially equal to each other and that the reception levels of the pilot channel signals received at the mobile station are as depicted by dotted lines 600 and 610. In this event, a soft hand-off area where the mobile station is communicable with both of the base stations 500 and 510 is an area between a point F and a point H and located substantially in the middle of the both base stations 500 and 510. If the traffic of the base station 500 approaches the allowable limit and deterioration of the communication quality of the base station 500 is detected, the transmission power levels of the pilot signals of the base stations 500 and 510 are decreased and increased, respectively. As a consequence, the reception levels of the pilot signals received at the mobile station are changed to those as depicted by solid lines 620 and 630.

As a result, after the transmission power is thus controlled, the soft hand-off area where the mobile station is communicable with both of the base stations 500 and 510 is shifted towards the base station 500. In other words, with respect to the communicating mobile station, the cell sizes of the base stations 500 and 510 are reduced and expanded, respectively. As a result, in the base station 500, the allowance of the traffic handling amount is increased and the traffic handling amount accommodated in the base station 500 is reduced.

Next referring to FIG. 7, description will be made about the case where the cell size is changed in response to the variation of the hand-off parameter T-DROP according to a second invention.

Figure 7:
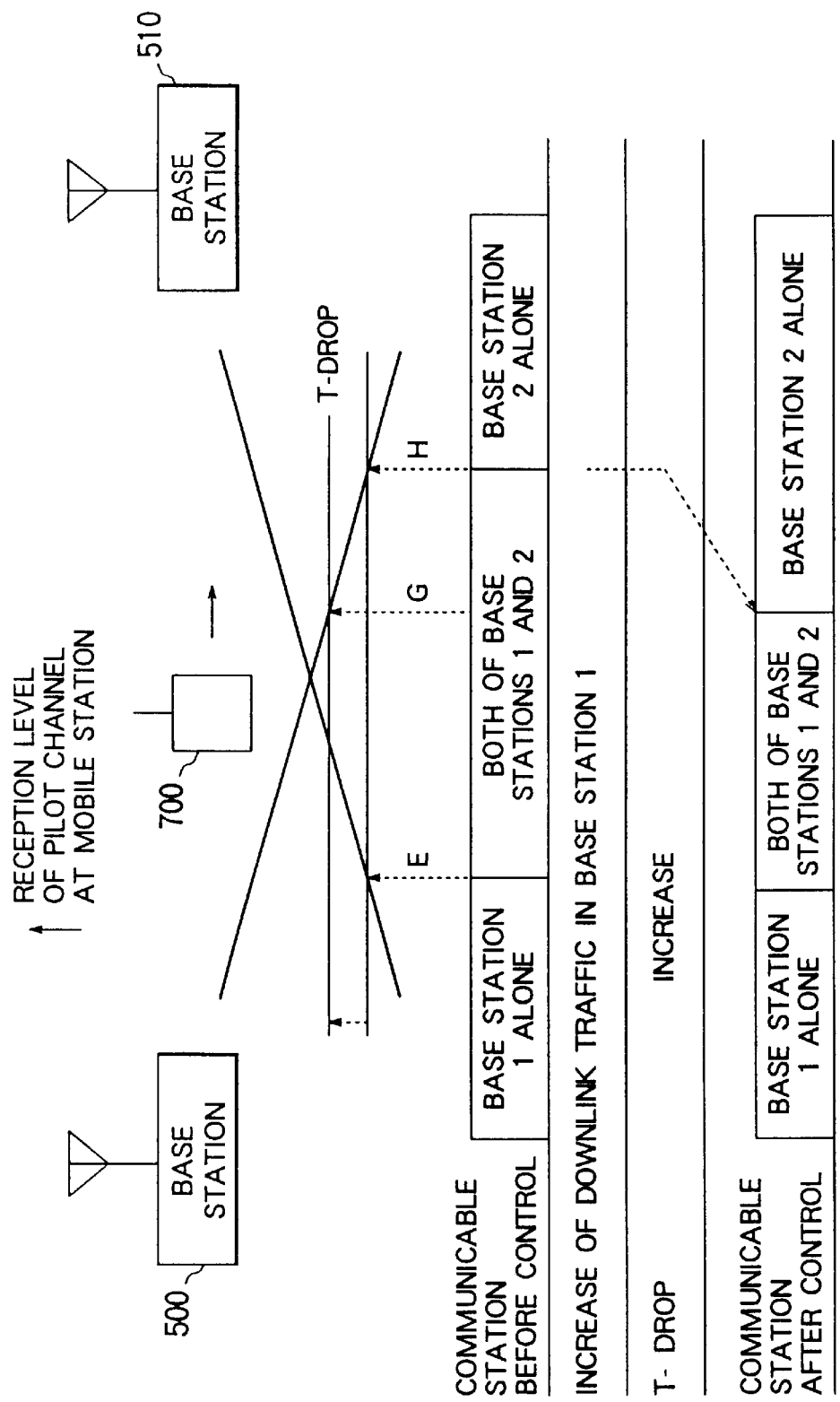
FIG. 7 shows a view for use in describing change of communicable ranges following the variation of a hand-off parameter T-DROP.

FIG. 7 is a view for describing the position where the communication with the base station 500 is disconnected when the mobile station 700 in soft hand-off between the base stations 500 and 510 is away from the communicating base station 500. The mobile station 700 during travelling receives the pilot signals of the base stations 500 and 510. At the point H where the reception level of the pilot signal of the base station 500 in soft hand-off does no longer satisfy the hand-off parameter T-DROP, the mobile station 700 requests the base station 500 to disconnect the communication.

On the other hand, the mobile station 700 measures the communication quality for the downlink signal from the communicating base station 500 and informs the communication quality to the communicating base station 500. When the base station 500 recognizes the deterioration in communication quality, the base station 500 increases the hand-off parameter T-DROP. As a result of the above-mentioned control, the position where the mobile station away from the base station 500 is shifted to the point G nearer to the base station 500.

This means that the number of the mobile stations communicating with the base station 500 is decreased. Therefore, a margin is produced in the transmission power for the downlink channels of the base station 500. The margin is distributed to the downlink communication channels being used so as to improve the communication quality of the downlink channels. In this case, the soft hand-off area is reduced so that the interference power to the uplink channel is increased. Correspondingly, the communication quality of the uplink channel is deteriorated.

Next referring to FIG. 8, description will be made about the case where the cell size is changed in response to the variation of the hand-off parameter T-ADD according to a third invention.

Figure 8:
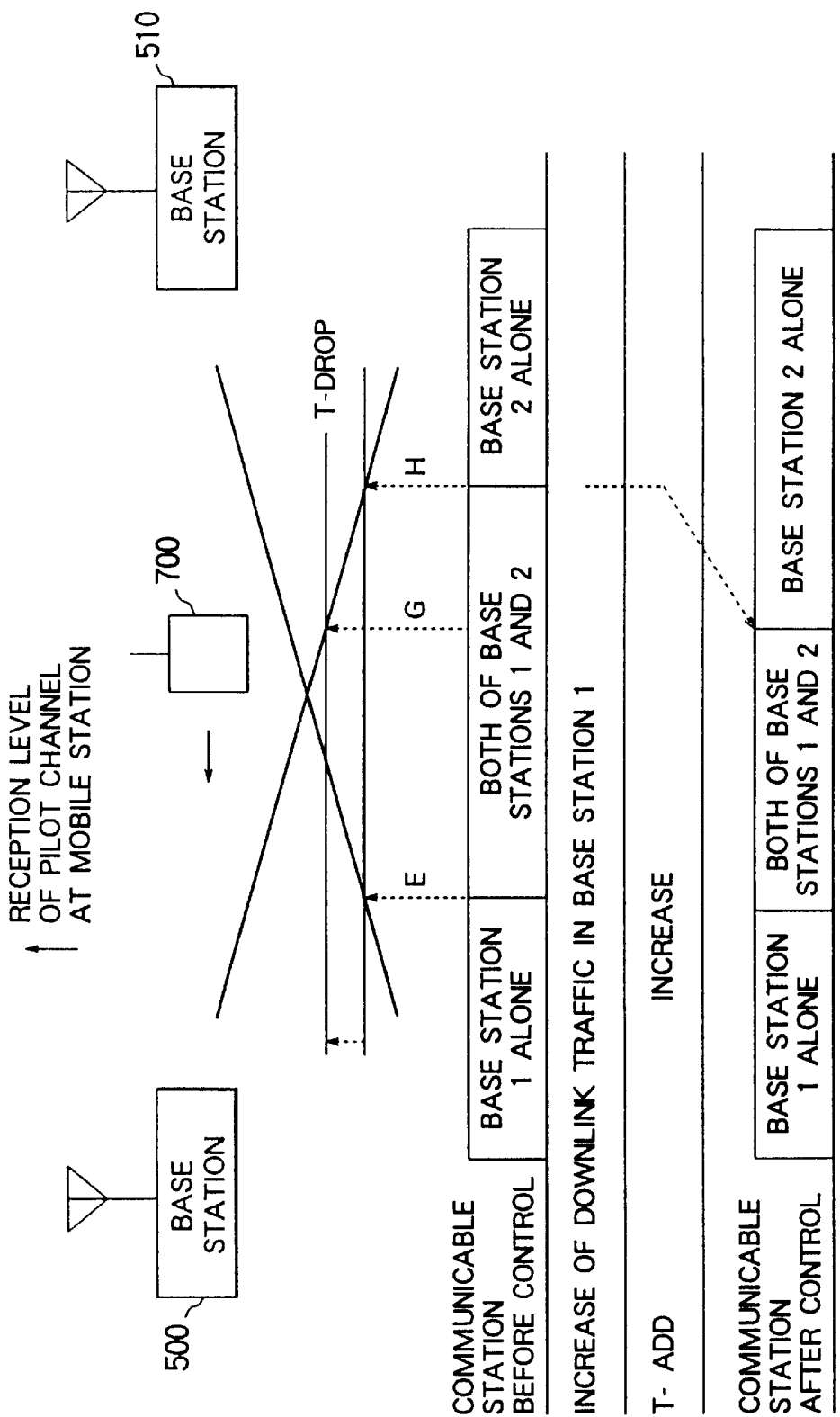
FIG. 8 shows a view for use in describing change of communicable ranges following the variation of a hand-off parameter T-ADD.

FIG. 8 is a view for describing the position where communication with the base station 500 is connected when the mobile station 700 between the base stations 500 and 510 and communicating with the base station 520 alone approaches the base station 500. The communicating mobile station 700 measures the reception level of the pilot channel signal of each base station. When the reception level of the pilot channel signal of another base station other than the communicating base station exceeds the hand-off parameter T-ADD, the mobile station 700 requests connection of communication with the above-mentioned another base station exhibiting an exceeding level.

If the communication quality of the downlink channel of the base station 500 is deteriorated, the base station 510 increases the hand-off parameter T-ADD. Accordingly, after the above-mentioned control, the position where the mobile station 700 approaching the base station 500 is connected with the base station 500 is shifted from the point H before the control to the point G nearer to the base station 500.

This means that the number of the mobile stations communicating with the base station 500 is decreased. Therefore, a margin is produced in the transmission power for the downlink channels of the base station 500. The margin is distributed to the downlink communication channels being used so as to improve the communication quality of the downlink channels. In this case, the soft hand-off area is reduced so that the interference power to the uplink channel is increased. Correspondingly, the communication quality of the uplink channel is deteriorated.

Next referring to FIG. 9, description will be made about the case where the cell size is changed in response to the variation of the hand-off parameters T-DROP and T-ADD according to fourth and fifth inventions.

Figure 9:
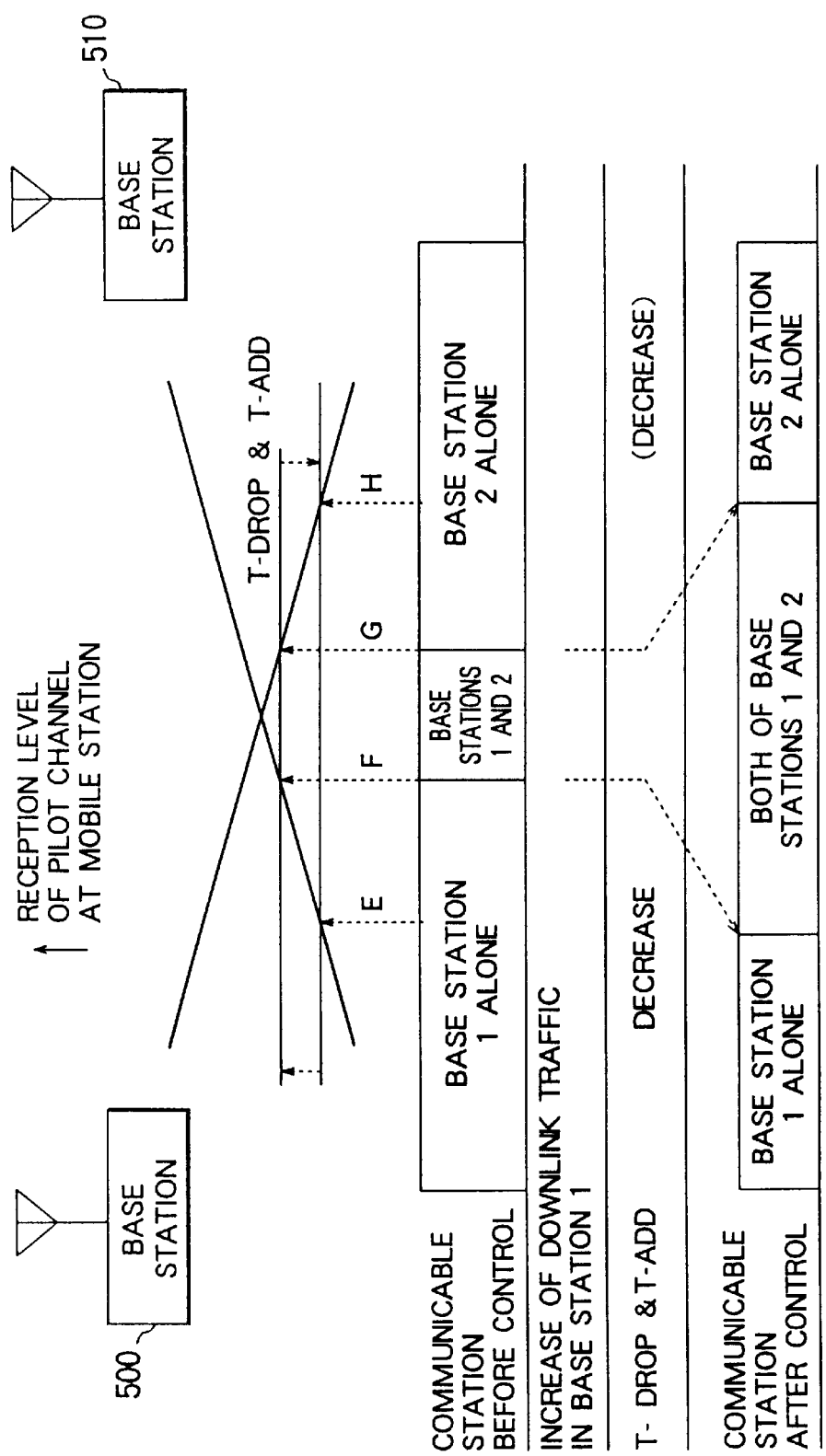
FIG. 9 shows a view for use in describing change of communicable ranges following the variation of the hand-off parameters T-DROP and T-ADD.

FIG. 9 is a view for describing how the base station to communicate with the mobile station is altered in dependence upon the position of the mobile station (not shown) between the base stations 500 and 510. For simplicity of description, the hand-off parameters T-DROP and T-ADD have the same level.

The communicating mobile station measures the reception level of the pilot channel signal of each base station. When the reception level of the pilot channel signal of another base station other than the communicating base station exceeds the hand-off parameter T-ADD, the mobile station requests connection with the base station exhibiting an exceeding level. If the reception level of the pilot channel signal of the base station in soft hand-off does no longer satisfy the hand-off parameter T-DROP, the base station in consideration is requested to disconnect communication.

If the communication quality of the uplink channel of the base station 500 is deteriorated, the hand-off parameters T-DROP and T-ADD of the base stations 500 and 510 are decreased. After the above-mentioned control, the soft hand-off area allowing communication with both the base stations 500 and 510 is changed from a range between the points F and G to a wider range between the points E and H nearer to the base stations 500 and 510, respectively.

This means that the ratio of the mobile stations reducing the transmission power levels is increased by the site diversity effect of the soft hand-off. Therefore, the communication quality of the uplink channel is improved. In this event, the soft hand-off area is expanded so that the interference power to the downlink channel is increased. Correspondingly, the communication quality of the downlink channel is deteriorated.

Figure 10:
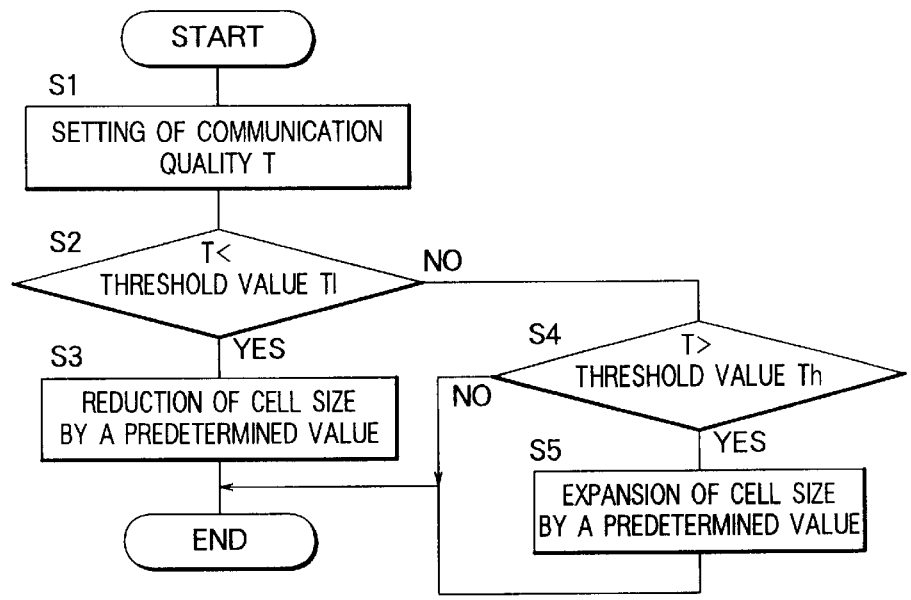
FIG. 10 is a flow chart for use in describing a first operation of the radio channel control apparatus illustrated in FIG. 3.

Next referring to FIG. 10 together with FIG. 3, description will be made about fundamental operation steps of the radio channel control apparatus 310 according to this invention.

At first, in the radio channel control apparatus 310, the radio channel control section 370 measures a predetermined point periodically, for example, at every second and carries out calculation upon a measured result to specify a communication quality T (step S1). When the communication quality T does not reach a predetermined lower-limit threshold value Tl and has a lower value (YES in step S2), the cell size is reduced by a predetermined value (step S3). The threshold value Tl is preliminarily selected, specifically, to 1% as the communication quality in terms of the bit error rate, 3% as the communication quality in terms of the frame error rate, and 5% as the communication quality in terms of the deterioration rate.

If "NO" in step S2 and the communication quality T exceeds the threshold value Tl and further exceeds a predetermined upper threshold value Th (YES in step S4), the radio channel control apparatus 310 expands the cell size by a predetermined value (step S5). If "NO" in the previous step S4 and the communication quality T is between the threshold values Th and Tl, no action is carried out. It is noted here that the threshold value Th is preliminarily determined, specifically, 0.1% as the communication quality in terms of the bit error rate, 0.3% as the communication quality in terms of the frame error rate, and 0.5% as the communication quality in terms of the deterioration rate.

Now, description will be made about the means and the steps in the first through the fifth inventions in conjunction with the operation of changing the cell size described in conjunction with FIG. 10.

Figure 11:
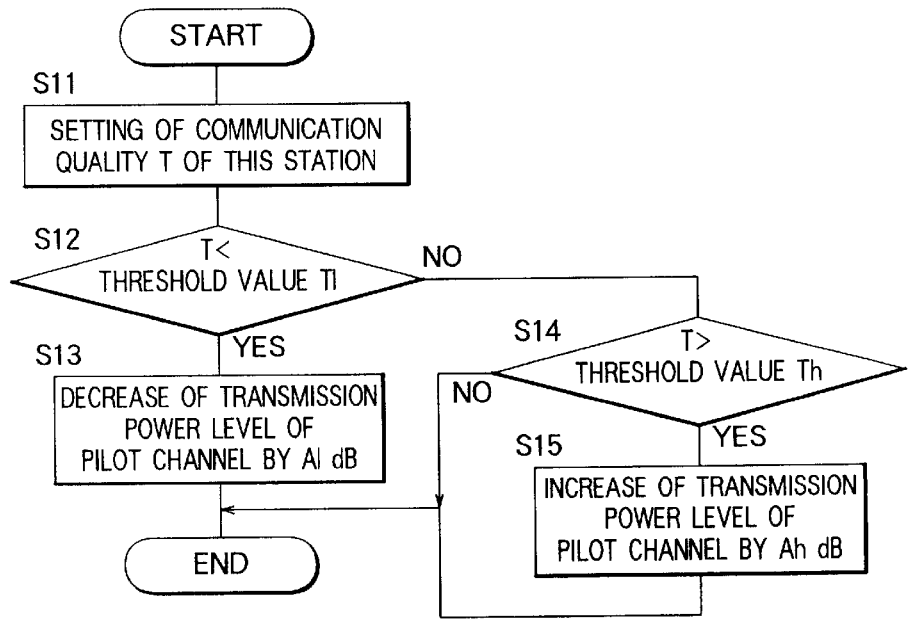
FIG. 11 is a flow chart for use in describing a second operation of the radio channel control apparatus illustrated in FIG. 3.

At first referring to FIG. 11 in combination with FIG. 3, description will be made about the steps relating to the first invention for changing the cell size by varying the transmission power level of the pilot signal.

In the invention, in the radio channel control apparatus 310, the radio channel control section 370 periodically measures the communication quality of at least one of the downlink and the uplink channels of this base station and specifies the communication quality T (step S11). When the communication quality T does not reach the threshold value Tl and has a lower value (YES in step S12), the pilot channel transmit section 350 is requested to decrease the transmission power level of the pilot signal by a predetermined level Al (dB) (for example, 1dB) (step S13). Thus, the cell size of the this station is reduced by the predetermined value.

If "NO" in the step S12 and the communication quality T exceeds the threshold value Tl and further exceeds the threshold value Th (YES in step S14), the radio channel control section 370 requests the pilot channel transmit section 350 to increase the transmission power level of the pilot signal by a predetermined level Ah (dB) (for example, 1dB) (step S15). Thus, the cell size of this station is expanded by the predetermined value. On the other hand, if "NO" in the step S14 and the communication quality T is between the threshold values Th and Tl, no action is taken.

It is noted here that the transmission power level of the pilot signal has lower and upper limit levels preliminarily selected and never takes a level out of such range.

Figure 12:
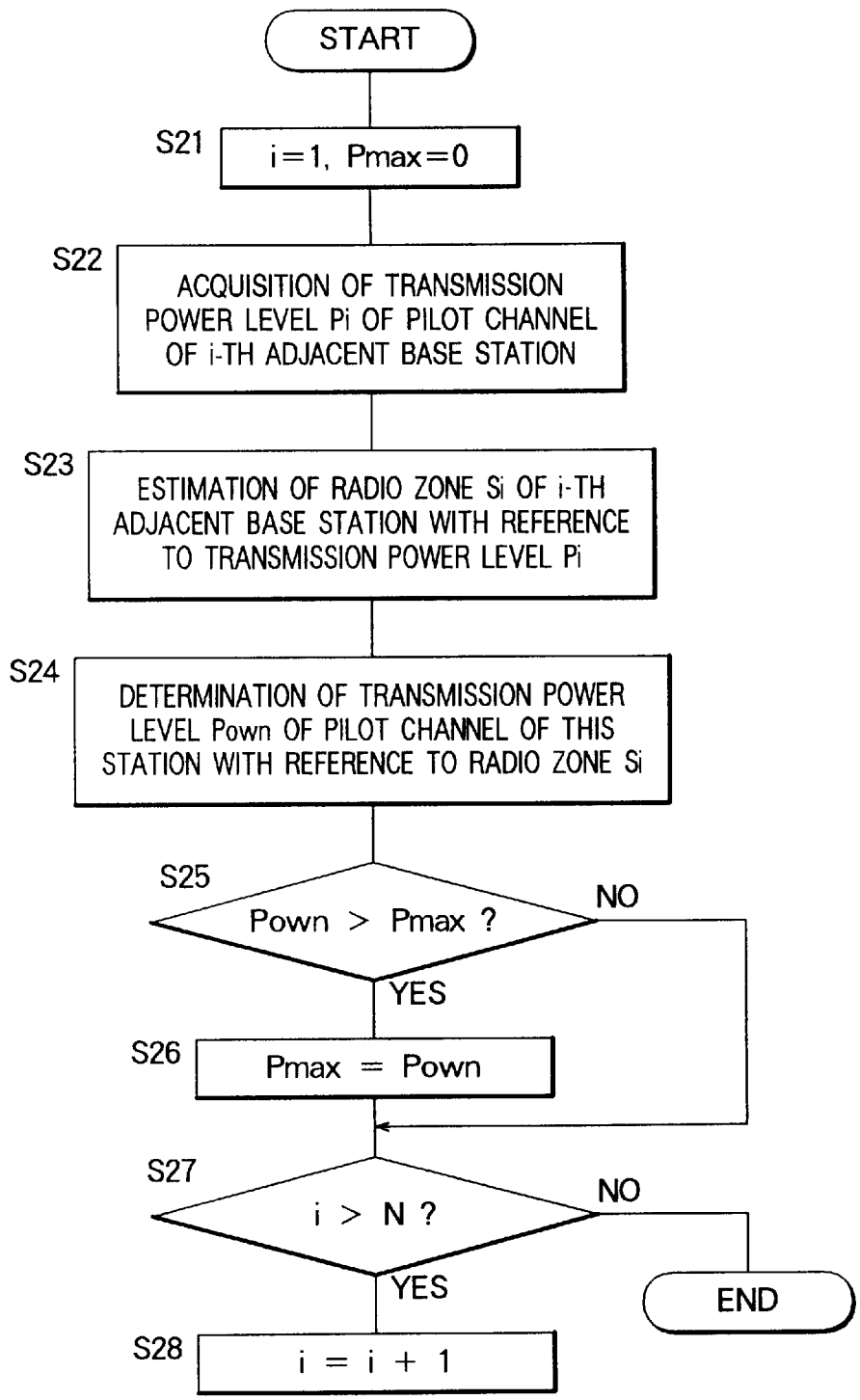
FIG. 12 is a flow chart for use in describing the second operation of the radio channel control apparatus illustrated in FIG. 3.

Next referring to FIG. 12 in combination with FIG. 3, description will be made about the steps of examining the cell size of the adjacent base station and determining the cell size of this base station.

At first, the radio channel control section 370 of the radio channel control apparatus 310 sets "i=1" as a parameter i (between 1 and N) identifying the adjacent base stations, N in number, and "Pmax=0" as a maximum transmission power level Pmax of the pilot channel signal of this base station (step S21).

Next, the radio channel control section 370 acquires the transmission power level Pi(=)1 of the pilot channel of the i(=1)-th adjacent base station (step S22). With reference to the transmission power level P1 of the pilot signal, estimation is carried out of the cell Si(=)1 of the above-mentioned adjacent base station as described above (step S23).

Subsequently, with reference to the estimated cell S1 of the adjacent base station, the radio channel control section 370 determines the transmission power level Pown of the pilot signal of this base station so that no gap is produced between the cells of the both base stations (step S24). The determined level is compared with the previously selected maximum transmission power level Pmax (=0) of the pilot signal of this base station (step S25).

If "YES" in the step S25 and "Pown >Pmax (=0)", the radio channel control section 370 sets "Pown" as the maximum transmission power level Pmax of the pilot signal of this base station (step S26) and compares the parameter i (=1) of the adjacent base station with the total number N of the stations (step S27). On the other hand, if "NO" in the step S25 and "Powm>Pmax" is not satisfied, the operation skips the step S26 and proceeds to the step S27.

If "YES" in the step S27 and "i=1<N", the radio channel control section 370 changes the parameter i(=1) into another parameter i+1 (=2) (step S28). The operation returns to the step S22. The operation is repeated until "i=N" is reached to respond "NO" in the step S27.

Figure 13:
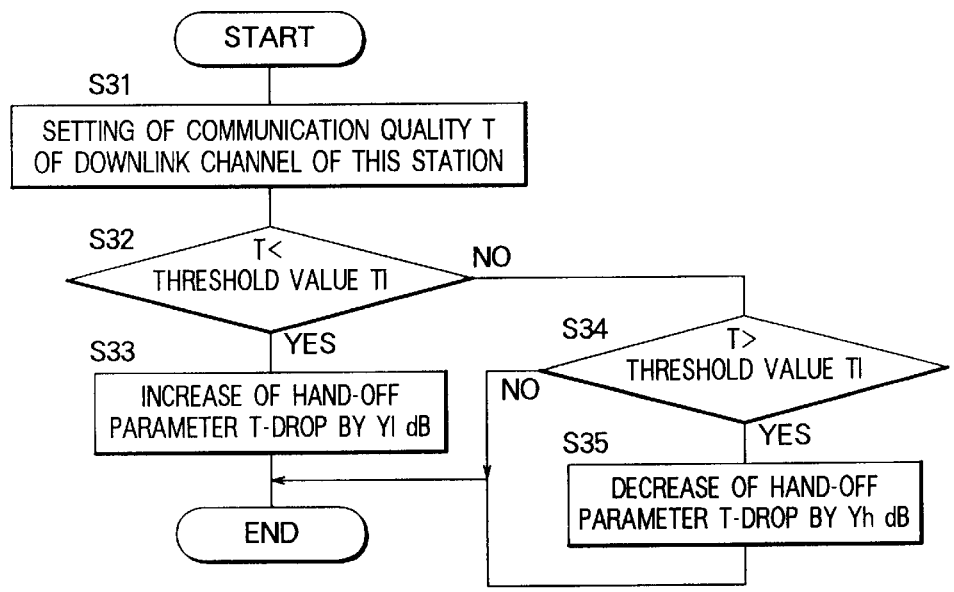
FIG. 13 is a flow chart for use in describing a third operation of the radio channel control apparatus illustrated in FIG. 3.

Next referring to FIG. 13 in combination with FIG. 3, description will be made about the steps relating to the second invention for changing the cell size by increasing or decreasing the hand-off parameter T-DROP following the variation in communication quality of the downlink channel of this base station.

In this invention, in the radio channel control apparatus 310, the radio channel control section 370 periodically measures the communication quality of the downlink channel of this base station and specifies the communication quality T (step S31). If the communication quality T does not reach the threshold value Tl and has a lower value (YES in step S32), the control channel transmit/receive section 340 is requested to increase the hand-off parameter T-DROP by a predetermined level Yl (dB) (for example, 1dB). Thus, for the mobile station, the cell size of this station is reduced by the predetermined value.

On the other hand, if "NO" in the step S32 and the communication quality T exceeds the threshold value Tl and further exceeds the threshold value Th (YES in step S34), the radio channel control section 16 requests the control channel transmit/receive section 13 to decrease the hand-off parameter T-DROP by a predetermined level Yh (dB) (for example, 1dB) (step S35). Thus, for the mobile station, the cell size of this station is expanded by the predetermined value. If "NO" in the previous step S34 and the communication quality T is between the threshold values Th and Tl, no action is taken.

It is noted here that the hand-off parameter T-DROP has lower and upper limit levels preliminarily determined. Out of the above-mentioned range, the hand-off parameter T-DROP will be neglected by the control channel transmit/receive section 340 and inhibited from delivery to the mobile station.

Figure 14:
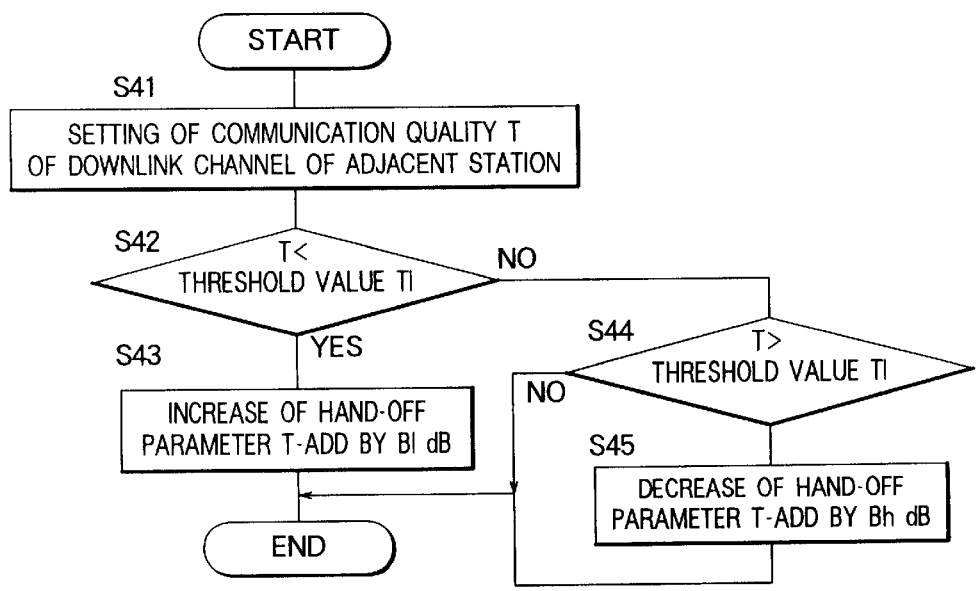
FIG. 14 is a flow chart for use in describing a fourth operation of the radio channel control apparatus illustrated in FIG. 3.

Next referring to FIG. 14 in combination with FIG. 3, description will be made about the steps relating to the third invention for changing the cell size of this base station by increasing or decreasing the hand-off parameter T-ADD following the variation in communication quality of the downlink channel of the adjacent base station.

In this invention, in the radio channel control apparatus 310, the radio channel control section 370 periodically measures the communication quality of the downlink channel of the adjacent base station and specifies the communication quality T (step S41). If the communication quality T does not reach the threshold value Tl and has a lower value (YES in step S42), the control channel transmit/receive section 340 is requested to increase the hand-off parameter T-ADD by a predetermined level Bl (dB) (for example, 1dB) (step S43). Thus, for the mobile station, the cell size of the adjacent station is reduced by the predetermined value.

If "NO" in the step S42 and the communication quality T exceeds the threshold value Tl and further exceeds the threshold value Th (YES in step S44), the radio channel control section 370 requests the control channel transmit/receive section 340 to decrease the hand-off parameter T-ADD by a predetermined level Bh (dB) (for example, 1dB) (step S45). Thus, for the mobile station, the cell size of the adjacent station is expanded by the predetermined value. If "NO" in the previous step S44 and the communication quality T is between the threshold values Th and Tl, no action is taken.

It is noted here that the hand-off parameter T-ADD has lower and upper limit levels preliminarily determined. Out of the above-mentioned range, the hand-off parameter T-ADD will be neglected by the control channel transmit/receive section 340 and inhibited from delivery to the mobile station.

Figure 15:
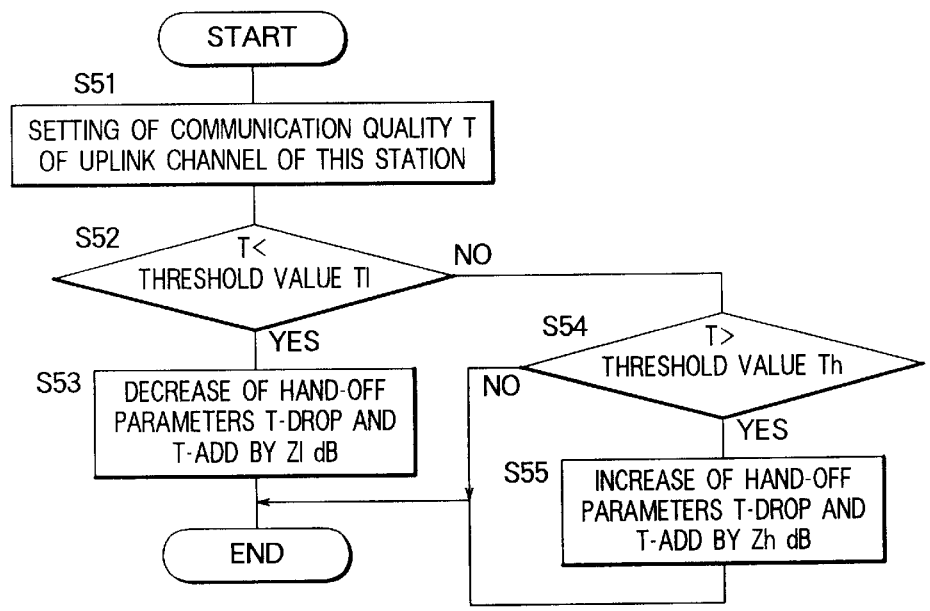
FIG. 15 is a flow chart for use in describing a fifth operation of the radio channel control apparatus illustrated in FIG. 3.

Next referring to FIG. 15 in combination with FIG. 3, description will be made about the steps relating to the fourth invention for changing the cell size by increasing or decreasing the hand-off parameters T-DROP and T-ADD following the variation of the uplink channel of this base station.

In this invention, in the radio channel control apparatus 310, the radio channel control section 370 periodically measures the communication quality of the uplink channel of this base station and specifies the communication quality T (step S51). If the communication quality T does not reach the threshold value Tl and has a lower value (YES in step S52), the control channel transmit/receive section 340 is requested to decrease the hand-off parameters T-DROP and T-ADD by a predetermined level Zl (dB) (for example, 1dB) (step S53). Thus, for the mobile station, the cell size of this station is reduced by the predetermined value.

On the other hand, if "NO" in the step S52 and the communication quality T exceeds the threshold value Tl and further exceeds the threshold value Th (YES in step S54), the radio channel control section 370 requests the control channel transmit/receive section 340 to increase the hand-off parameters T-DROP and T-ADD by a predetermined level Zh (dB) (for example, 1dB) (step S55). Thus, for the mobile station, the cell size of this station is expanded by the predetermined value. If "NO" in the previous step S54 and the communication quality T is between the threshold values Th and Tl, no action is taken.

Like the foregoing description, the hand-off parameters T-DROP and T-ADD have lower and upper limit levels preliminarily determined. Out of the above-mentioned ranges, the hand-off parameters will be neglected by the control channel transmit/receive section 340 and inhibited from delivery to the mobile station.

Next referring to FIG. 16 in combination with FIG. 3, description will be made about the steps relating to the fifth invention for changing the cell size of this base station by increasing or decreasing the hand-off parameters T-DROP and T-ADD following the variation in communication quality of the uplink channel of the adjacent base station.

In this invention, in the radio channel control apparatus 310, the radio channel control section 370 periodically measures the communication quality of the uplink channel of the adjacent base station and specifies the communication quality T (step S61). If the communication quality T does not reach the threshold value Tl and has a lower value (YES in step S62), the control channel transmit/receive section 340 is requested to decrease the hand-off parameters T-DROP and T-ADD by a predetermined level Cl (dB) (for example, 1dB) (step S63). Thus, for the mobile station, the cell size of this station is expanded by the predetermined value.

If "NO" in the step S62 and the communication quality T exceeds the threshold value Tl and further exceeds the threshold value Th (YES in step S64), the radio channel control section 370 requests the control channel transmit/ receive section 340 to increase the hand-off parameters T-DROP and T-ADD by a predetermined level Ch (dB) (for example, 1dB) (step S65). Thus, for the mobile station, the cell size of this station is reduced by the predetermined value. If "NO" in the previous step S64 and the communication quality T is between the threshold values Th and Tl, no action is taken.

Like the foregoing description, the hand-off parameters T-DROP and T-ADD have lower and upper limit levels preliminarily determined. Out of the above-mentioned ranges, the hand-off parameters will be neglected by the control channel transmit/receive section 340 and inhibited from delivery to the mobile station.

The hand-off parameter T-ADD has lower and upper limit levels preliminarily determined. Out of the above-mentioned ranges, the hand-off parameter T-ADD will be neglected by the control channel transmit/receive section 13 and inhibited from delivery to the mobile station.

In the foregoing description, the radio channel control apparatus is equipped in the base station. Alternatively, it may be included in a superior control unit.

In the foregoing description, the communication quality is periodically measured at every second. However, the timing of measurement is not restricted to the foregoing description but can be freely selected. Likewise, description has been given with reference to the illustration of the functional blocks and the operation steps. However, redistribution of the functions, such as separation and combination, and replacement of the order of the steps can be freely made. Thus, any modification is allowable as far as the above-mentioned functions are satisfied and the foregoing description does not restrict this invention at all.

As described above, according to this invention, there is provided the radio channel control apparatus wherein the base station decreases the transmission power level of the pilot signal in response to deterioration of the communication quality of each of the uplink and the downlink channels in each of this base station and the adjacent base station. With this structure, the base station reduces the cell size upon increase in traffic and resultant deterioration of the transmission quality. Thus, the traffic margin against thermal noise is increased so that the traffic accommodation capacity is increased.

There is also provided the radio channel control apparatus wherein the adjacent base stations inform the transmission power levels of the pilot signals to each other so that the cell sizes are estimated to thereby adjust the transmission power level of the pilot channel of each base station. With this structure, if the traffic is increased and the communication quality is deteriorated in the base station, the cell size of the adjacent base station can be expanded. Accordingly, the traffic contained in the cell of the base station with the increased traffic can be distributed to the adjacent base station.

There is also provided the radio channel control apparatus wherein the transmission power level of the pilot channel signal is increased following an increase in communication quality. With this structure, the base station expands the cell size upon reduction of the traffic and resultant increase in communication quality. Thus, the traffic contained in the cell of the base station with the increased traffic can be distributed to the adjacent base station.

There is also provided the radio channel control apparatus wherein the hand-off parameters T-DROP and T-ADD are increased for the communicating mobile station when the downlink channel is deteriorated. With this structure, the number of the communicating mobile stations is reduced to produce the margin in the downlink transmission power. The margin is distributed to the downlink communication channels being used. Thus, the communication quality of the downlink channel is improved to keep the balance in communication quality between the uplink and the downlink channels.

There is also provided the radio channel control apparatus wherein the hand-off parameters T-DROP and T-ADD are decreased for the communicating mobile station when the uplink channel is deteriorated. With this structure, the soft hand-off area is expanded. By the diversity effect, the ratio of the mobile stations with the decreased transmission power level is increased. Thus, the communication quality of the uplink channel is improved to keep the balance in communication quality between the uplink and the downlink channels.

As a result, by increasing or decreasing the transmission power level of the pilot channel or by increasing or decreasing the hand-off parameters, the cell size is changed so that the traffic in each base station is controlled. In this manner, the communication quality is kept excellent.

What is claimed is:

1. A radio channel control apparatus for use in a base station of a CDMA cellular system to control communication which is carried out between said base station and mobile stations in a cell by the use of code-division multiplexed radio channels and a pilot signal sent from said base station, with a communication quality monitored by said base station, said radio channel control apparatus comprising:

quality monitoring means for monitoring the communication quality of at least one of said code-division multiplexed radio channels to produce a quality monitoring signal representative of said communication quality; and power level control means for controlling a power level of said pilot signal in response to said quality monitoring signal to change the cell in size from one to another in dependency upon the power level of the pilot signal.

2. A radio channel control apparatus as claimed in claim 1, wherein said power level control means decrease said power level to a first predetermined power level when said quality monitoring signal represents that said communication quality is inferior to a first predetermined quality.

3. A radio channel control apparatus as claimed in claim 2, wherein said power level control means increase said power level to a second predetermined power level when said quality monitoring signal represents that said communication quality is superior to a second predetermined quality.

4. A radio channel control apparatus for use in a base station of a CDMA cellular system to control communication which is carried out between said base station and mobile stations in a cell by the use of code-division multiplexed radio channels and a pilot signal sent from said base station, with a communication quality monitored by said base station, said base station being connected to a superior control unit for producing an arbitration signal which adjusts the cell, said radio channel control apparatus comprising:

quality monitoring means for monitoring the communication quality of at least one of said code-division multiplexed radio channels to produce a quality monitoring signal representative of said communication quality;

transmitting means for transmitting said quality monitoring signal to said superior control unit;

receiving means for receiving said arbitration signal produced by said superior control unit in response to ones of said quality monitoring signal from said base stations; and power level control means for controlling a power level of said pilot signal in response to said quality monitoring signal and said arbitration signal to change the cell in size from one to another in dependency upon the power level of the pilot signal.

5. A radio channel control apparatus for use in a base station of a CDMA cellular system to control communication which is carried out between said base station and mobile stations in a radio zone by the use of code-division multiplexed radio channels and a control channel, with a communication quality monitored by said base station, said radio channel control apparatus comprising:

quality monitoring means for monitoring the communication quality of at least one of said code-division multiplexed radio channels to produce a quality monitoring signal representative of said communication quality; and parameter delivery means for delivering a hand-off parameter to said mobile stations through said control channel in response to said quality monitoring signal to practically change the cell in size from one to another in dependency upon the hand-off parameter.

6. A radio channel control apparatus as claimed in claim 5, said hand-off parameter including a first hand-off parameter unit which is produced by monitoring downward ones of the code-division multiplexed radio channels given from said base station, wherein said hand-off parameter delivery means delivers said first hand-off parameter unit as said hand-off parameter to said mobile station.

7. A radio channel control apparatus as claimed in claim 5, said hand-off parameter including first and second hand-off parameter units which are produced by monitoring upward ones of the code-division multiplexed radio channels given from said base station, wherein said hand-off parameter delivery means delivers said first and second hand-off parameter units as said hand-off parameter to said mobile station.

8. A radio channel control apparatus for use in a base station of a CDMA cellular system to control communication which is carried out between said base station and mobile stations in a radio zone by the use of code-division multiplexed radio channels and a control channel, with a communication quality monitored by said base station, said base station being connected to a superior control unit, said radio channel control apparatus comprising:

quality monitoring means for monitoring the communication quality of at least one of said code-division multiplexed radio channels to produce a quality monitoring signal representative of said communication quality;

transmitting means for transmitting said quality monitoring signal to said superior control unit;

receiving means for receiving an arbitration signal produced by said superior control unit in response to ones of said quality monitoring signal form said base stations; and parameter delivery means for delivering a hand-off parameter to said mobile stations through said control channel in response to said quality monitoring signal and said arbitration signal to practically change the cell in size from one to another in dependency upon the hand-off parameter.

9. A CDMA cellular system having base stations each of which has a radio channel control apparatus to control communication carried out between the base station and mobile stations in a cell by the use of code-division multiplexed radio channels with a communication quality monitored by the base station, said radio channel control apparatus of each of said base stations comprising:

cell size control signal producing means for producing a cell size control signal for changing the cell in size from one to another;

quality monitoring means for monitoring the communication quality of at least one of said code-division multiplexed radio channels to produce a quality monitoring signal representative of said communication quality; and level control means for controlling said cell size control signal in response to said quality monitoring signal to change the cell in size from one to another in dependency upon cell size control signal.

10. A CDMA cellular system as claimed in claim 9, wherein said cell size control signal is a pilot signal for selecting one from said base stations in each of said mobile stations.

11. A CDMA cellular system as claimed in claim 9, wherein said cell size control signal is a hand-off parameter for selecting one from said base stations in each of said mobile stations.

12. A CDMA cellular system as claimed in claim 11, wherein said hand-off parameter includes a first parameter for dropping said communication in each of said mobile stations and second parameter for changing a destination of said communication in each of said mobile stations.

13. A CDMA cellular system as claimed in claim 11, said CDMA cellular system having a superior control unit, said level control means for controlling said cell size control signal in response to said quality monitoring signal and an arbitration signal from said superior control unit, said radio channel control apparatus of each of said base stations further comprises:

transmitting means for transmitting said quality monitoring signal to said superior control unit;

receiving means for receiving said arbitration signal produce by said superior control unit in response to ones of said quality monitoring signal from said base stations.

14. A method of controlling radio communication which is carried out between a base station and mobile stations by the use of code-division multiplexed radio channels in a cell of a CDMA cellular system, with a communication quality monitored by the base station, said method comprising the steps of:

producing a cell size control signal for changing the cell in size from one to another;

monitoring the communication quality of at least one of said code-division multiplexed radio channels to produce a quality monitoring signal representative of said communication quality; and controlling said cell size control signal in response to said quality monitoring signal to change the cell in size from one to another in dependency upon cell size control signal.

* * * * *